United States Patent [19]

Kawano et al.

[11] 4,006,790
[45] Feb. 8, 1977

[54] ELECTROMAGNETIC GUIDANCE SYSTEM

[75] Inventors: Shigeyoshi Kawano, Hitachiota; Hisao Hanmura; Masayoshi Sunada, both of Hitachi, all of Japan

[73] Assignee: Hitachi, Ltd., Japan

[22] Filed: Jan. 8, 1975

[21] Appl. No.: 539,424

[30] Foreign Application Priority Data

Jan. 11, 1974  Japan .................................. 49-5979
July 8, 1974  Japan .............................. 49-77271

[52] U.S. Cl. .......................... 180/98; 104/148 MS; 180/79.1; 318/587
[51] Int. Cl.² ....................................... B60K 27/06
[58] Field of Search ............... 104/88, 148; 180/98, 180/79.1; 179/82; 318/587, 580; 191/2, 10, 22 C; 235/150.2

[56] References Cited

UNITED STATES PATENTS

| | | | |
|---|---|---|---|
| 3,029,893 | 4/1962 | Mountjoy | 180/98 |
| 3,038,970 | 6/1962 | Paluka | 180/98 |
| 3,132,710 | 5/1964 | Petrella et al. | 180/98 |
| 3,628,624 | 12/1971 | Wesener | 180/98 |
| 3,669,208 | 6/1972 | Brooke | 180/98 |
| 3,669,209 | 6/1972 | Brooke | 180/98 |
| 3,745,572 | 7/1973 | Sato et al. | 180/98 |
| 3,764,985 | 10/1973 | Hochreiter | 180/98 |
| 3,768,586 | 10/1973 | Thompson et al. | 180/98 |
| 3,820,623 | 6/1974 | Akashi et al. | 180/98 |

Primary Examiner—Trygve M. Blix
Assistant Examiner—Galen L. Barefoot
Attorney, Agent, or Firm—Craig & Antonelli

[57] ABSTRACT

An electromagnetic guidance system used, for example, for guiding a driverless mobile vehicle. For example, a two-core wire or cable is in the surface of a travelling course. The core conductors of the two-core wire are connected at its end so that current may circulates through the conductor. By detecting the magnetic flux induced by the circulating current by means of detecting coils mounted on the driverless mobile vehicle, the vehicle can be automatically run along the two-core wire without any change-over operation.

10 Claims, 24 Drawing Figures

ELECTROMAGNETIC GUIDANCE SYSTEM

The present invention relates to an electromagnetic guidance system useful especially for guiding a driverless mobile vehicle or the like.

According to the conventional system of this kind, if the travelling path network or travelling course has many branches, the change-over operation with a control device having change-over means provided along the travelling paths is needed to guide the driverless vehicle to the preselected destination. The change-over operation will be very complicated if the number of the branch paths is large enough, and moreover it is usual that the greater is the number of the change-over means, the greater is the numbers of the faults and the erroneous operations of the overall system. Thus, the conventional system could not be free from rather frequent faults and erroneous operations without checking at short intervals.

It is therefore the object of the present invention to provide a system which can electromagnetically guide a mobile vehicle along travelling paths without the change-over of the paths, no matter what complex pattern the travelling paths may constitute.

According to the main feature of the present invention, two parallel conductors are horizontally arranged along travelling paths; the ends of the conductors are connected together at the end of each branch path so that current flows in the opposite directions respectively through the conductors and that an hf current from an oscillator is caused to flow throughout the whole conductors without any change-over operation; and the mobile vehicle is smoothly run along every course or branch path.

According to another feature of the present invention, the magnetic field generated from the horizontally disposed parallel conductors are detected by detecting coils mounted on the vehicle, and the vehicle is turned to the right at a branch point mainly by following the right-hand half of the magnetic field generated by the conductors while it is turned to the left at a branch point mainly by following the left-hand half of the magnetic field generated by the conductors.

According to yet another feature of the invention, two parallel conductors are vertically arranged along the travelling paths so that the above described features are realized, the construction of the arrangement of the conductors is facilitated and the branching characteristics are improved.

The present invention will be described below by way of embodiment with the aid of the accompanying drawings, in which.

Figure 1:
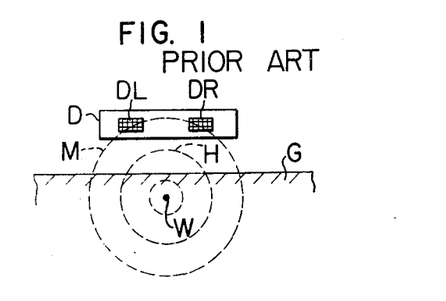
FIGS. 1 and 2 show a conventional electromagnetic guidance system, FIG. 1 corresponding to the cross section of a principal portion of the system and FIG. 2 being a wiring diagram of the conductors.
Figure 2:
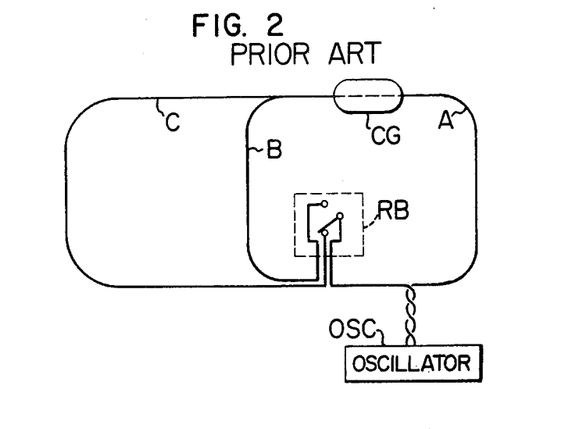

One of the conventional systems for guiding a driverless mobile vehicle is as shown in FIGS. 1 and 2. Namely, as seen in FIG. 1, a single wire W is embedded in the surface of the road on and along which the vehicle is to move. An hf current is passed through the wire W and the magnetic flux M induced by the hf current is detected by the two detecting coils DL and DR of a detecting unit D mounted on the vehicle CG. The vehicle is so steered that the difference of the outputs of the detecting coils may be reduced to zero, whereby the vehicle is automatically run along the embedded wire W. FIG. 2 shows an example of the layout of such a wire, the course consisting of travelling paths A, B and C.

Now, if it is desired to run a vehicle along the path B or C, an oscillator OSC, the path A and the path B or C must be connected in series. However, if the paths B and C are respectively connected together with the oscillator OSC, the path C is short-circuited by the path B so that the current through the path C becomes small. Especially, in case where the path C is very long, that is, the path C has a large impedance, magnetic flux sufficient for detection cannot be generated. In this case, in order to induce sufficient magnetic flux about the path C, the output of the oscillator OSC must be increased. However, if the output of the oscillator is of large power, too large a current flows through the path A to give rise to an undesirable result. This problem is specifically serious in the case where there are many branch paths. In order to eliminate such a problem, a change-over switch RB is used which changes over the paths B and C. In FIG. 2, for example, a closed circuit: the oscillator OSC—the path A—the path C—the oscillator OSC, is formed. In this case, the vehicle CG can run along the paths A and C. On the other hand, if it is desired to run the vehicle CG along the path B, it is necessary to connect the paths A and B in series with the oscillator OSC and to disconnect the path C from the oscillator OSC, by means of the change-over switch RB.

Figure 3:
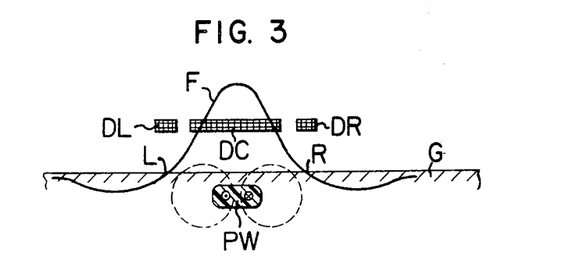
FIG. 3 is a cross section of a principal portion of an electromagnetic guidance system as one embodiment of the present invention, in which two conductors are parallel and horizontally disposed.

FIG. 3 shows a cross section of the principal portion of an electro-magnetic guidance system. In FIG. 3, PW indicates two conductors horizontally disposed parallel to each other and embedded in the surface of the road G. For such conductors is suitable, for example, a two-core cable with a sheath of a synthetic resin, which is usually used in communications system. F designates a symmetrical distribution of the intensity of the magnetic field generated by the two-core cable and DR, DC and DL detecting coils mounted on the lower surface of a driverless mobile vehicle (not shown). If the vehicle is caused to detect and follow the right-hand side distribution of the magnetic field, the detecting coils DC and DR are used, while if it is desired to run the vehicle detecting and following the left-hand side distribution of the field, the detecting coils DC and DL are brought into operation. In FIG. 3, L and R indicate the left and the right slopes of the magnetic firld, respectively.

Figures 4, 5, 6, 7A:
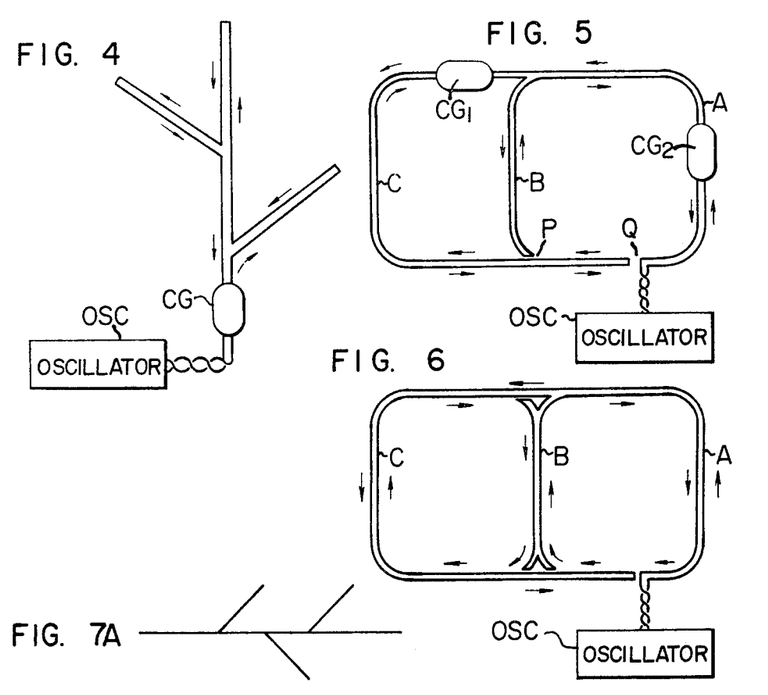
FIG. 4 shows the fundamental pattern of wiring the conductors, according to the present invention.
FIG. 5 is the modified version of the wiring pattern shown in FIG. 2, according to the pattern shown in FIG. 4.
FIG. 6 is an improved version of the wiring pattern shown in FIG. 5.
FIGS. 7A – 7E show examples of travelling courses available in the present invention.

Next, the way of laying down two parallel conductors along the course to be travelled by a vehicle, which is the gist of the present invention, will be described with the aid of FIGS. 4 and 5. FIG. 4 shows the simplest, fundamental course in which all the branch paths are straight. This course involves the basic idea of the present invention. Namely, it is only necessary to lay down a single conductor continuously along the outline of the tree-like pattern in the figure. Thus, the conductor is connected in series with the oscillator OSC, that is, the conductor forms a closed loop with the oscillator. This is what could not be achieved by the conventional system in which each of the branch paths as well as the main path consists of a single conductor. It should be specifically noted that every path consists of a two-core cable or a line having two parallel conductors, such as a feeder used in television system and that the two-cores or conductors are connected together at the end of every branch path so as to form a closed loop as a whole. With such a two-core cable, there is obtained an advantage that the induced magnetic field is in symmetry along every portion of the main path and every branch path.

FIG. 5 shows an improved version of the conventional course shown in FIG. 2, according to such an artifice according to the present invention as shown in FIG. 5. The arrows in FIGS. 4 and 5 indicate the direction of the currrent from the oscillator OSC during the positive half cycle of the alternating period, and it is here noted that irrespective of which path a vehicle is travelling along and irrespective of the direction of the travelling of the vehicle, current flows in the right-hand conductor of the parallel conductors as viewed from the vehicle forward. This is convenient for making the vehicles travel by making use of the slopes of the above-mentioned magnetic field intensity distribution, without creating irregularity of the magnetic field intensity distribution at the branch points. If it is desired to run the vehicle backward as well as forward, it is only necessary to provide another detecting unit in the rear part of the vehicle. Of course, it is possible to run the vehicle backward without using the rear detecting unit, but in this case the safety in the running of the vehicle is sacrificed to a certain degree.

In FIG. 5, if it is desired to advance the vehicle $CG_2$ resting in the path A counterclockwise into the path B, it is only necessary for the vehicle to follow the left-hand slope of the magnetic field intensity distribution as viewed from the vehicle forward. On the other hand, if the vehicle is desired to advance counterclockwise into the path C, it has only to follow the right-hand slope of the magnetic field intensity distribution as viewed from the vehicle forward.

In the travelling cource shown in FIG. 5, the magnetic field is disturbed to some extent at the points P and Q, but no problem will be caused due to the inertial coasting of the vehicle.

FIG. 6 shows a travelling course which is an improvement on the course shown in FIG. 5. This improved course is advantageous in that the vehicle can travel from the path B to the path C continuously (without moving backward) and vice versa. It is very difficult for the conventional system to realize such a travelling course as shown in FIG. 6.

Figure 7B:
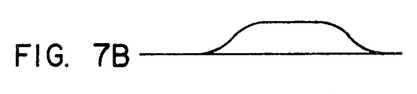
Figure 7C:
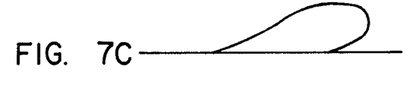
Figures 7D, 7E:
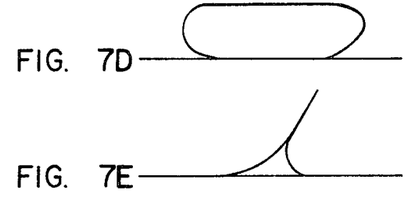

FIGS. 7A and 7E schematically show examples of travelling courses which can be realized according to the present invention. FIG. 7A shows the fundamental pattern of travelling course according to the invention. Moreover, according to the invention, it is possible to provide a by-pass as shown in FIG. 7B, a U-turn path as shown in FIG. 7C, a loop path as shown in FIG. 7D, and Y-shaped path as shown in FIG. 7E. Further, an X-shaped pattern can also be formed on the analogy of the Y-shaped pattern. The detailed description of these patterns is omitted since one can apply to these patterns what has been described of the courses shown in FIGS. 4, 5 and 6.

In the previous embodiments, the paths of every course are provided with two parallel conductors embedded horizontally. With this parallel arrangement, however, rather a wide groove must be cut to accommodate the travelling path conductors therein so that the work of embedding the conductors becomes laborious.

Another embodiment of the present invention, which can be free from the above mentioned drawbacks will be described below. The feature of this improved embodiment is as follows. Two parallel conductors are embedded vertically in the surface of the course, the parallel conductors arranged vertically are connected together at the end of every path, and the whole course is energized by an ac power source. On both sides of the so-called two-core wire are respectively created a pair of points at which the intensity of the induced magnetic field is maximum. In view of the points of maximum field intensity, a detecting coil is provided on each of the left and right sides, of the vehicle and another coil is provided at the center of the vehicle. Thus, the vehicle is run by following one of the points on the left and right sides so that the vehicle can easily select which path to follow, left or right.

Figure 8:
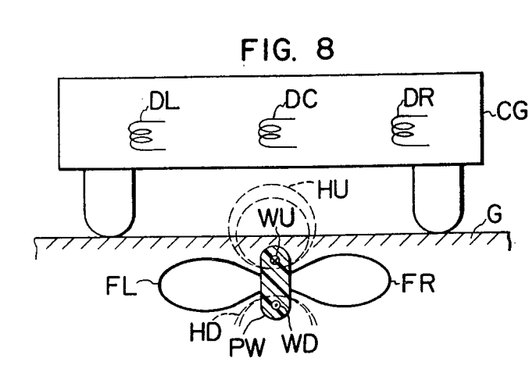
FIG. 8 shows another embodiment of the present invention, in which two conductors are in vertically parallel arrangement.

FIG. 8 shows such an embodiment as described just above, in which are shown a two-core wire in embedded position and three detecting coils mounted on a vehicle. The vehicle CG is provided with a drive means and steering means for steering the vehicle according to the outputs of the detecting coils. In FIG. 8, a two-parallel-core wire PW is embedded in the floor ground G. The wire PW consists of an upper conductor WU and a lower conductor WD. Ac currents flow through the upper and lower conductors in opposite directions to each other so that ac fields as indicated by FL and FR are induced on both the sides of the wire PW. The phase of the field at FL is opposite to that at FR. The lines of magnetic force are as shown at HU and HD in FIG. 8. In order to detect the magnetic field and to run the vehicle along the travelling course, the vehicle CG is provided with three detecting coils DL, DC and DR. The coils DL, DC and DR are so arranged that every turn of each of the coils is horizontal to pick up the vertical component of the lines of the magnetic force.

Figure 10A:
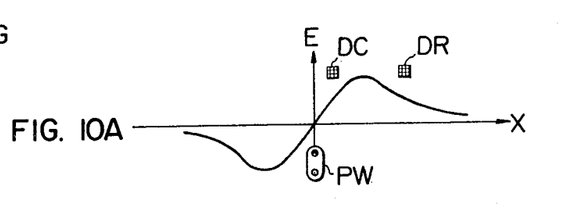
FIGS. 10A – 10C show the voltages induced in the detecting coils.

FIG. 10A shows the relationship, as a result of measurement, between distance X and voltage E, the distance X being one measured laterally from the center of the wire PW and the voltage E being one induced in the coils. The voltage E is shown as being negative on the left side of the wire PW. This means that the phases of the voltages on the right and left sides are opposite to each other.

Figure 9:
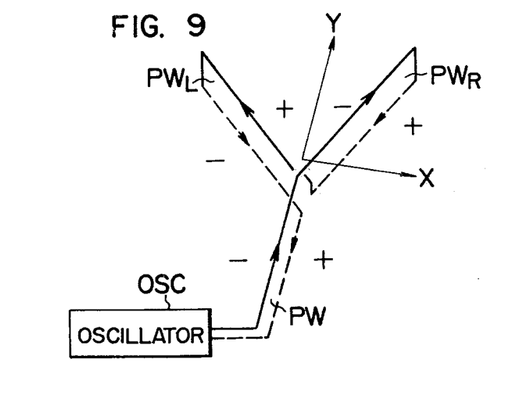
FIG. 9 shows a basic way of wiring conductors in the embodiment shown in FIG. 8.

The detail of the wiring of the upper and lower conductors WU and WD will now be described with the aid of FIG. 9. This figure shows the layout of the two-core wire in a simple, Y-shaped pattern and the associated distribution of the magnetic field. In FIG. 9, $PW_R$ and $PW_L$ indicate respectively a right branch path and a left branch path, and the upper and lower conductors are respectively indicated by solid and broken lines. The interconnection of the upper and lower conductors in all the paths is as follows: when one follows the upper or lower conductor from the main path to the branch path, one sees current in the same direction along these paths. As to the phase of the magnetic field, on the other hand, the fields of the branch paths $PW_L$ and $PW_R$ cancel each other in the space between the paths, and the phases of the fields on the left side of the left branch path $PW_L$ and on the right side of the right branch path $PW_R$ are the same as those on the left and right sides of the main path PW, as shown in FIG. 9 in which the directions of current are indicated by arrows and the phases of fields by plus and minus signs.

Figure 10B:
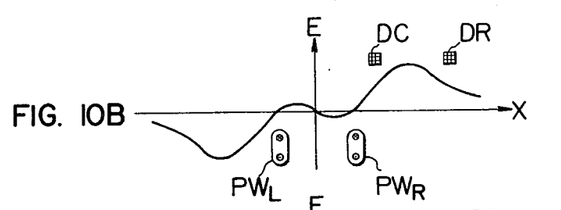
Figure 10C:
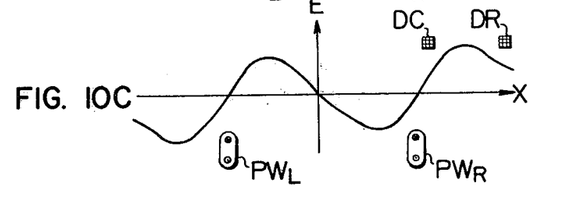

FIGS. 10A, 10B and 10C respectively show the waveforms of the voltage E induced in detecting coils, the abscissa X designating the position of the coil. The ordinate is taken along the main path PW and the origin of the coordinate system is chosen to be at the branch point, as shown in FIG. 9. FIG. 10A corresponds to the case where Y<0, i.e., the detecting coil is above the main path PW; FIG. 10B to the case where the coil has proceeded a little distance with respect to the ordinate Y; and FIG. 10C to the case where the coil has advanced a further distance with respect to the ordinate Y. The relative positions of the embedded two-core wire and the detecting coils are also depicted in these figures. It is readily seen from the above description that if the right-side crest of the voltage waveform can be followed by any means, the right branch path can be selected at the branch point and that if the left-side trough of the voltage waveform can be trailed in like manner, the left branch path can be chosen.

Figure 11:
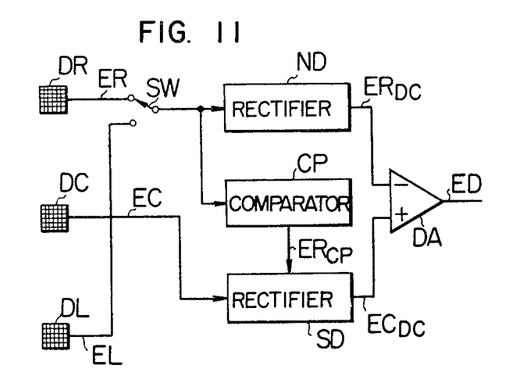
FIG. 11 is a block diagram of the detecting cicuit.
Figure 12:
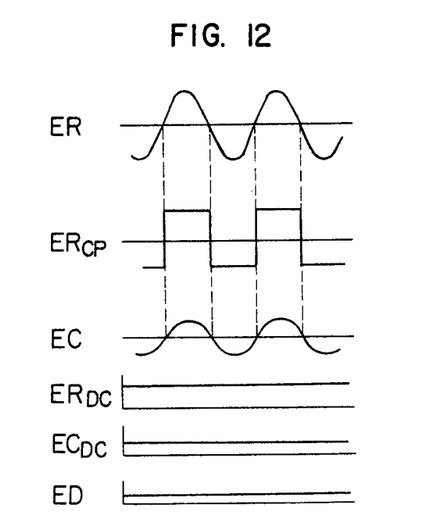
FIG. 12 shows the waveforms of the output of the detecting circuit.

FIG. 11 is a block diagram of a detecting circuit for following such crest and trough as mentioned above. The operation of the detecting circuit will be described in the case where the right side branch is to be selected. A change-over switch SW for selecting a branch is in the position as shown. In this case, only the detecting coils DC and DR shown in FIG. 8 are used and when the vehicle is properly following the right crest of the voltage waveform, the successive positions of the coils are as shown in FIGS. 10A, 10B and 10C. The waveforms appearing at several points in the circuit shown in FIG. 11 are shown in FIG. 12.

In the circuit of FIG. 11, the output voltage ER of the detecting coil DR is directly rectified by a rectifier ND to be turned to a dc voltage $ER_{DC}$. On the other hand, the output ER is fed to a comparator CP so that a rectangular waveform $ER_{CP}$ synchronous with the output ER is derived. The output voltage EC of the detecting coil DC is synchronously rectified by a synchronous rectifier SD using the rectangular signal $ER_{GP}$ as synchronizing signal, to be converted to a dc voltage $EC_{DC}$. The polarity of the dc voltage $EC_{DC}$ is positive or negative according as the output voltages EC and ER are in phase with or opposite in phase to each other, and the amplitude of the voltage $EC_{DC}$ is in proportion to the voltage EC. Finally, a dc voltage ED is derived through subtracting $ER_{DC}$ from $EC_{DC}$ in a differential amplifier DA. The dc voltage ED is the output of the detecting circuit of FIG. 11 and is reduced to zero when the vehicle is in such a position that the detecting coils DR and DC deliver equal voltages, as shown in FIG. 10. If the vehicle moves to the right of the position, then EC>ER so that ED>0. If, on the other hand, the vehicle moves to the left of the point, then ED<0.

Figure 13A:
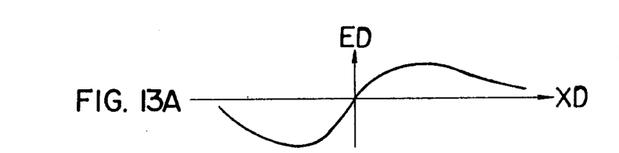
FIGS. 13A – 13C show the detecting characteristics of the detecting circuit.
Figure 13B:
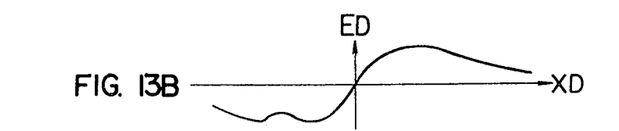
Figure 13C:
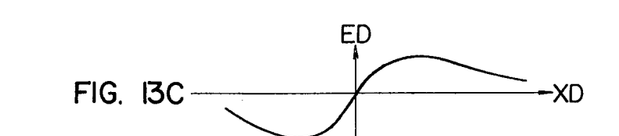

FIGS. 13A, 13B and 13C respectively show the relationships between the detected outputs ED and the distances XD in the X-direction of the vehicle CG corresponding to FIGS. 10A, 10B and 10C, where the distance is measured from the main path wire PW or the right branch path wire $PW_R$ to the detecting coil DC (hereafter each path and its associated embedded two-core wire are designated for simplicity's sake by the same reference character). As seen in FIG. 13B, when the vehicle has advanced a little distance to the right branch path $PW_R$ from the branch point, a slight influence of the left branch path wire $PW_L$ still remains. However, also in this case, a detected output substantially proportional to the distance from the wire to be followed can be obtained.

If the induced voltage ED is merely rectified without being synchronized with ER, the detected output $EC_{DC}$ is not negative but positive when the vehicle deviates to the left to shift the detecting coil DC to the left of the main path wire PW or the left branch path wire $PW_L$, so that a range for proportional detected output can be hardly obtained.

Once such detected outputs as shown in FIGS. 10A to 10C are obtained, it is very easy with the conventional control techniques to run the vehicle along a line in such a manner that ED = 0, by making the steering angle of the vehicle proportional to ED.

On the other hand, in order to run the vehicle along the left trough of the waveform and to select the left branch path $PW_L$, it is only necessary to change over the selection switch SW in the circuit of FIG. 11 to utilize the voltage EL induced in the detecting coil DL instead of the voltage ER. The operation in this case is the same as what has been described above for the case of selecting the right branch path and therefore the description thereof is omitted here.

Figure 14:
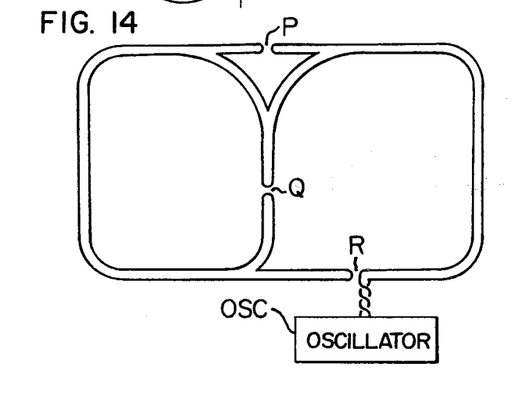
FIG. 14 and FIG. 15 show travelling courses.

FIG. 14 shows the case where the travelling course is not simply in the shape of Y but more complicated. In this figure, the conductors of the two-core wire embedded along the travelling course are shown as if they lie horizontally parallel to each other, but this is only for convenience's sake and the conductors are in fact vertically parallel to each other and arranged as shown in FIG. 9 at every branch point. Also, in this case, there are discontinuities of magnetic field at the points P, Q and R. However, since the gap length is about 30mm while the distance of the inertial coasting of the vehicle is several times that length, then no disturbance is caused in the practical guiding of the vehicle.

Figure 15:
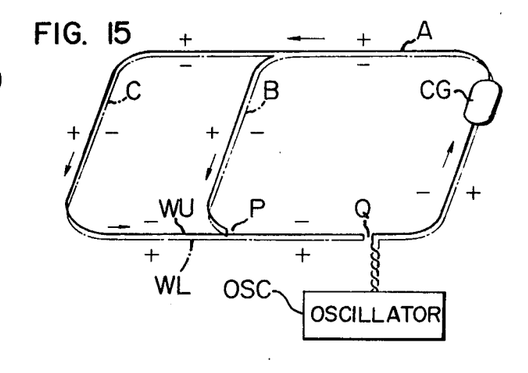

FIG. 15 shows a travelling course which is similar to that shown in FIG. 5 but different in that the conductors of the two-core wire are here vertically parallel to each other. The solid line and the chain line represent the upper conductor and the lower conductor, respectively. The arrows indicate the direction of current flow in the upper conductor. The plus and minus signs represent as in FIG. 9, the phase relation between the magnetic fields generated by the conductors.

Figure 16:
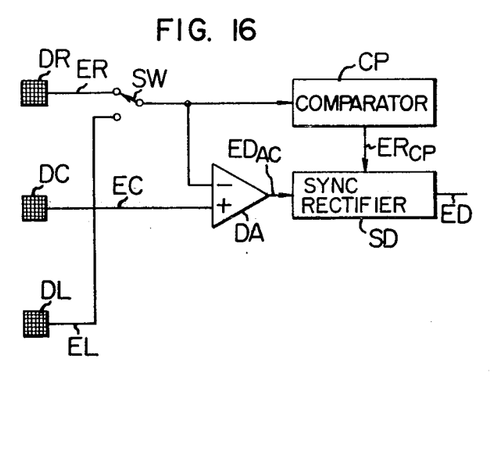
FIG. 16 is a block diagram of another examplary detecting circuit according to the invention.

FIG. 16 shows a modification of the detecting circuit shown in FIG. 11 and the same reference characters are applied to like parts or circuit elements in both figures. The ac voltage ER and EC are directly applied to a differential amplifier DA, which delivers an ac difference signal $ED_{AC}$. It is here apparent that the difference signal $ED_{AC}$ depends on the difference in amplitude and phase between the voltages ER and EC. On the other hand, the voltage ER is applied to the comparator CP, which delivers the rectangular waveform $ER_{CP}$ shown in FIG. 12. The sync rectifier SD, using $ER_{CP}$ as synchronizing signal, synchronously rectifies $ED_{AC}$ and delivers a dc voltage ED having a positive or negative polarity as shown in FIG. 11. Thus, if two conductors are embedded along a travelling course with one disposed vertically and parallel to the other and if such a detecting circuit as shown in FIG. 11 is used, then a driverless mobile vehicle can be easily run along a left or right branch path.

If the vehicle is desired to move backward as well as forward, it must be provided with a pair of field detecting units in the front and rear ends thereof, as described previously. It is also possible to use only one detecting unit at the sacrifice of traffic safety to some extent.

In FIG. 15, if the vehicle CG is desired to advance counterclockwise from the path A to the path C, it has only to detect and follow the magnetic field on the right side as viewed from the vehicle forward. On the other hand, if the vehicle is desired to advance into the path B, it should follow the left-side magnetic field. Moreover, if the vehicle located at the position as shown in the figure is desired to move clockwise into the path B, it must detect and follow the right-side field ahead of it.

In the embodiments described above, the two-core wire is embedded in the surface of the travelling course, but this is not a sole way of providing the wire along the courses. For example, the wire may be fixed on the surface by means of adhesive. The preferable or desirable points in embodying the present invention are as follows:

a. For the two-core wire used in this invention, a feeder for use in communications systems is preferable, but other conductors may be used as such;

b. The oscillator can be replaced by any means which can send current through the embedded wire. In this case, the detecting coils must be selected depending upon the frequency of the current generated by the means;

c. The present invention can be applied to ordinary motor cars and traffic means;

d. This invention can also be applied to a curve tracer used in automatic welding apparatus;

e. A variety of surfaces can serve as the travelling course of this invention, and f. In laying down the conductors, either a continuous wire may be layed down along the travelling course in a manner of a single-stroke drawing, or a feeder for communications system may be used with its end closed. The feeder may be better from the standpoint of labor of preparing travelling paths.

As described above, according to the present invention, current, e.g. hf current, can be always sent through the conductors provided along the travelling course, whatever shape it may assume, so that if this invention is applied to a driverless mobile vehicle, the vehicle can be run along any path of the travelling course. Moreover, according to the present invention, there is no need for change-over means which is essential for the conventional system to change over the travelling path wires or to switch over the frequencies, so that a driverless mobile vehicle can be electromagnetically run with ease and accuracy.

What we claim is:

1. An electromagnetic guidance system comprising two conductors disposed parallel and closely adjacent to each other and laid down in a predetermined pattern; means for connecting the two conductors in series with each other; means for supplying current for the conductors; and means for detecting magnetic field induced by the current, wherein a desired apparatus is controlled to be guided along the conductors according to the output of the detecting means, and wherein the two conductors are vertically parallel to each other.

2. An electromagnetic guidance system as claimed in claim 1, wherein the conductors are laid down in a predetermined pattern having branches and there is provided another means for running the desired apparatus by following one of the magnetic fields induced on both the sides of the conductors.

3. An electromagnetic guidance system as claimed in claim 2, wherein the spacing of the two conductors is less than the width of the guided apparatus.

4. An electromagnetic guidance system comprising two conductors disposed parallel and closely adjacent to each other and laid down in a predetermined pattern; means for connecting the two conductors in series with each other; means for supplying current for the conductors; and means for detecting magnetic field induced by the current, wherein a desired apparatus is controlled to be guided along the conductors according to the output of the detecting means, and wherein said two conductors are provided in a single cable.

5. An electromagnetic guidance system as claimed in claim 4, wherein the single cable is a feeder cable for a communication system.

6. A system as claimed in claim 5, wherein said single cable is a flat cable of the twin lead type having said two conductors laid parallel and attached to each other by an insulating material.

7. An electromagnetic guidance system comprising two conductors disposed parallel and closely adjacent to each other and laid down in a predetermined pattern; means for connecting the two conductors in series with each other; means for supplying current for the conductors; and means for detecting magnetic field induced by the current, wherein a desired apparatus is controlled to be guided along the conductors according to the output of the detecting means, and wherein said detecting means is provided on the guided apparatus and comprises:

a first detecting coil disposed on the left side of said guided apparatus, a second detecting coil disposed on the right side of said guided apparatus, a third detecting coild disposed at the center of said guided apparatus, switching means for selecting one of the first and second detecting coil output, rectifier circuit means for rectifying the output of the switching means, comparator circuit means for providing a rectangular waveform voltage synchronous with the output of the switching means, synchronous rectifier means for receiving the output of the third detecting coil and the output of the comparator circuit means, and differential amplifier means for receiving the output of the rectifier circuit means and the output of the synchronous rectifier means for providing an output for controlling the direction of the guided apparatus.

8. An electromagnetic guidance system comprising two conductors disposed parallel and closely adjacent to each other and laid down in a predetermined pattern; means for connecting the two conductors in series with each other; means for supplying current for the conductors; and means for detecting magnetic field induced by the current; wherein a desired apparatus is controlled to be guided along the conductors according to the output of the detecting means, and wherein said detecting means is provided on the guided apparatus and comprises:

a first detecting coil disposed on the left side of said guided apparatus, a second detecting coil disposed on the right side of said guided apparatus, a third detecting coil disposed in the center of said guided apparatus, a switching means for selecting one of the first and second detecting coil output, differential amplifier means for receiving the output of the switching means and the output of the third detecting coil for providing an output indicative of the difference therebetween, comparator circuit means for providing a rectangular waveform voltage synchronous with the output of the switching means, and synchronous rectifier means for receiving the output of the differential amplifier means and the output of the comparator circuit means for providing an output for controlling the direction of said guided apparatus.

9. An electromagnetic guidance system comprising two conductors disposed horizontally parallel and closely adjacent to each other and laid down in a predetermined pattern; means for connecting the two conductors in series with each other; means for supplying electric current for the conductors; and means for detecting magnetic field induced by the current, said detecting means including at least three detectors mounted on a vehicle, at least two of said at least three detectors being arranged outwardly with respect to said two conductors so as to sense such portions of said magnetic field as being outward with respect to said two conductors; wherein said vehicle is controlled to be guided along said two conductors according to the output of the detecting means.

10. A system as claimed in claim 9, wherein said predetermined pattern comprises a travel course for said vehicle and includes a main path and at least one branch path from said main path, each of said main and branch paths having said two conductors positioned in the central portion of each path, said two conductors being connected in series to each other and connected to said electric current supplying means so as to form a single closed loop along with said electric current supplying means.

* * * * *